(12) United States Patent
Kidd et al.

(10) Patent No.: US 6,770,202 B1
(45) Date of Patent: Aug. 3, 2004

(54) POROUS MEMBRANE

(75) Inventors: Stanley Kidd, Westbury, NY (US); Thomas C. Gsell, Glen Head, NY (US)

(73) Assignee: Pall Corporation, East Hills, NY (US)

( * ) Notice: Subject to any disclaimer, the term of this patent is extended or adjusted under 35 U.S.C. 154(b) by 0 days.

(21) Appl. No.: 09/958,490

(22) PCT Filed: Apr. 13, 2000

(86) PCT No.: PCT/US00/09831

§ 371 (c)(1),
(2), (4) Date: Feb. 4, 2002

(87) PCT Pub. No.: WO00/61267

PCT Pub. Date: Oct. 19, 2000

Related U.S. Application Data

(60) Provisional application No. 60/129,227, filed on Apr. 14, 1999.

(51) Int. Cl.[7] ............................ B01D 61/00; B01D 71/32
(52) U.S. Cl. ............... 210/650; 210/321.6; 210/321.75; 210/483; 210/488; 210/500.21; 210/500.36; 210/649; 210/653; 264/41
(58) Field of Search ........................ 210/321.6, 321.75, 210/483, 488, 500.21, 500.27, 500.36, 640, 649, 650, 651, 652, 653; 264/41; 96/4, 5, 6, 14; 436/177, 178

(56) References Cited

U.S. PATENT DOCUMENTS

| | | | |
|---|---|---|---|
| 4,384,047 A | * 5/1983 | Benzinger et al. ............ 521/64 |
| 4,399,264 A | 8/1983 | Squire | |
| 4,545,862 A | * 10/1985 | Gore et al. .................... 203/10 |
| 4,553,983 A | 11/1985 | Baker | |
| 4,754,009 A | 6/1988 | Squire | |
| 4,931,181 A | 6/1990 | Blume et al. | |
| 4,963,165 A | 10/1990 | Blume et al. | |
| 4,990,255 A | 2/1991 | Blume et al. | |
| 5,049,167 A | 9/1991 | Castro et al. | |
| 5,051,114 A | 9/1991 | Nemser et al. | |
| 5,085,775 A | 2/1992 | Swamikannu | |
| 5,116,650 A | 5/1992 | Bowser | |
| 5,139,881 A | * 8/1992 | Henis et al. ................. 424/488 |
| 5,238,471 A | 8/1993 | Blanchet-Fincher | |
| 5,281,255 A | 1/1994 | Toy et al. | |
| 5,653,882 A | * 8/1997 | Moss et al. .................. 210/490 |
| 5,749,942 A | 5/1998 | Mattis et al. | |
| 5,976,380 A | * 11/1999 | Moya .......................... 210/650 |
| 6,179,132 B1 | * 1/2001 | Moya .......................... 210/490 |
| 6,221,247 B1 | * 4/2001 | Nemser et al. ........... 210/321.6 |
| 6,369,178 B1 | * 4/2002 | McCarthy .................... 526/242 |

FOREIGN PATENT DOCUMENTS

| | | |
|---|---|---|
| EP | 0 540 862 A2 | 5/1993 |
| JP | 03221130 | 9/1991 |

* cited by examiner

*Primary Examiner*—John Kim
(74) *Attorney, Agent, or Firm*—Leydig, Voit & Mayer, Ltd.

(57) ABSTRACT

The present invention provides integral porous membranes comprising an amorphous halopolymer, as well as processes for preparing the membranes, and devices comprising the membranes. An example of an amorphous halopolymer is a copolymer of tetrafluoroethylene and perfluoro-2,2-dimethyl-1,3-dioxole.

34 Claims, 1 Drawing Sheet

POROUS MEMBRANE

This application claims the benefit of provisional patent application No. 60/129,227, filed Apr. 14, 1999, which is incorporated by reference.

TECHNICAL FIELD

The present invention relates to an integral porous membrane comprising an amorphous halopolymer in general, and, in particular, to an integral porous membrane comprising an amorphous fluoropolymer, a process for preparing such a membrane, and a process for treating fluids by using such a membrane.

BACKGROUND OF THE INVENTION

The treatment of corrosive or reactive fluids such as sulfuric acid and hydrofluoric acid has been a challenge to the industry, particularly to the separation/filtration industry. Although halopolymers, particularly fluoropolymers, have significant resistance to many chemicals, solvents, as well as corrosive fluids, halopolymer membranes or filters are of limited availability, due in part, to the inherent properties of the halopolymers. Many halopolymers, particularly, fluoropolymers, have a limited solubility in solvents suitable for preparing membranes. Alternatively, the halopolymers have very high melting points, decompose at elevated temperatures, and/or involve complex processes for converting them into membranes.

A composite membrane has been proposed wherein an amorphous fluoropolymer is disposed as a surface treatment or coating on the pore walls of a porous substrate. This membrane is not satisfactory for many applications because, for example, it may fail to provide the desired filtration efficiency and/or the membrane lacks solvent and chemical resistance, e.g., due to the poor solvent and/or chemical resistance of some porous substrates. The layers constituting certain composite membranes also tend to delaminate, for example, under use or cleaning conditions. Thus, there exists a need for a porous halopolymer membrane that is suitable for treating corrosive or reactive fluids.

The advantages of the present invention, as well as additional inventive features, will be apparent from the description of the invention provided herein

SUMMARY OF THE INVENTION

The foregoing need has been fulfilled by the present invention which provides an integral porous membrane comprising an amorphous halopolymer. The amorphous halopolymer constitutes the bulk or body of the membrane rather than merely being disposed as a surface treatment or coating an a porous material.

The present invention further provides processes for preparing the integral porous membrane. The membrane is preferably prepared by a process comprising casting a solution of the halopolymer and causing phase inversion to occur. The present invention further provides devices comprising the membrane and processes for treating fluids.

While the invention has been described and disclosed below in connection with certain embodiments and procedures, it is not intended to limit the invention to those specific embodiments. Rather it is intended to cover all such alternative embodiments and modifications as fall within the scope of the invention.

SPECIFIC DESCRIPTION OF THE INVENTION

Figure 1:
FIG. 1 depicts a Scanning Electron Micrograph of the surface of an integral porous membrane according to an embodiment of the present invention.

The present invention provides an integral porous membrane comprising an amorphous halopolymer. Unlike composite membranes, the entire membrane according to a preferred embodiment of the present invention, i.e., the surface as well as the porous substratum, bulk, or body, has the same composition, e.g., they are composed of the same amorphous halopolymer. For example, the entire integral membrane is made of the same amorphous fluoropolymer. In embodiments, the integral membrane can be made from a blend of halopolymers. The preparation of the integral porous membrane of the present invention does not require disposition of a surface treatment or surface coating on the pore walls of a pre-existing or pre-formed porous material.

If desired, the integral membrane can be prepared or placed on a substrate or support material, wherein the material can be porous or non-porous, to provide a supported membrane. In an embodiment, the amorphous halopolymer can at least partially coat the pore walls of a porous support. The average pore size of the membrane is typically less than that of the coated or uncoated support. The selectivity and/or permeability of the membrane is preferably provided by the integral membrane, rather than the support.

The halopolymers suitable for preparing the membranes of the present invention are amorphous. The halopolymers have a low degree of crystallinity, e.g., less than about 30% (±2%), preferably less than about 20%, more preferably less than 10%, and even more preferably about 0%. It is further preferred that the halopolymer is non-crystallizable. The degree of crystallinity can be determined by any suitable method, e.g., wide-angle x-ray diffractometry, infrared spectroscopy, nuclear magnetic resonance spectrometry, or differential scanning calorimetry. The degree of crystallinity also can be obtained from the density of the halopolymer. The amorphous halopolymer is soluble in solvents, preferably in halogenated solvents, and more preferably in fluorinated solvents, at ambient temperatures (about 20–25° C.).

Any suitable amorphous halopolymer can be used to prepare the membranes of the present invention, preferably, amorphous polymers comprising chlorine or fluorine, and more preferably amorphous polymers comprising fluorine. The amorphous halopolymer can be a homopolymer or, preferably, a copolymer. The amorphous copolymer comprises any suitable combination of halogenated monomers. The copolymer can include any number of comonomers, preferably 2 to 4 comonomers, and more preferably at least 2 comonomers.

Examples of suitable monomers include fluorinated olefin monomers such as tetrafluoroethylene ("TFE"), vinylidene fluoride, hexafluoropropylene, and chlorotrifluoroethylene, and fluorinated functional monomers such as perfluoroalkylvinyl ethers, perfluoroesters, perfluorosulfonylfluorides, and perhalodioxoles, preferably perfluorodioxoles. A preferred halopolymer is a copolymer of tetrafluoroethylene and a perfluorodioxole. Preferred perfluorodioxoles are perfluoro-1,3-dioxole and perfluoro-2,2-dimethyl-1,3-dioxole ("PDD"). A further preferred halopolymer is a copolymer of PDD with one or more comonomers, for example, fluorinated olefins such as TFE, vinylidene fluoride, hexafluoropropylene, and chlorotrifluoroethylene, and fluorinated functional monomers such as perfluoroalkylvinyl ethers, perfluoroesters, and perfluorosulfonylfluorides. A particular example of a halopolymer suitable for preparing the membrane of the present invention is a copolymer of PDD and TFE.

The amorphous copolymer can contain comonomers in any suitable proportion. For example, the copolymer can include PDD in a proportion of from about 40% (±2%) to about 99% by mole, preferably from about 60% to about 90% by mole, and more preferably from about 60% to about 70% by mole. Thus, the copolymer of PDD and TFE can include from about 10% to about 40% by mole of TFE and from about 90% to about 60% by mole of PDD, preferably, from about 30% to about 40% by mole of TFE and from about 70% to about 60% by mole of PDD, and more preferably about 35% by mole of TFE and about 65% by mole of PDD. In certain embodiments, the preferred copolymer includes about 15% by mole of TFE and about 85% by mole of PDD. The amorphous halopolymer can include additional components, e.g., comonomers.

The halogenated copolymer can be prepared by methods known to those skilled in the art. For example, the comonomers can be polymerized by using a free radical initiator as illustrated in U.S. Pat. No. 4,754,009, column 4, line 60, to column 5, line 52, the disclosure of which is incorporated herein in its entirety by reference. Suitable copolymers of TFE and PDD include, but are not limited to, those available commercially as TEFLON AF™ 1600 and AF 2400 polymers from DuPont Co. The AF 1600 polymer is reported to have a PDD content of about 65% by mole and a TFE content of about 35% by mole, and the AF 2400 polymer is reported to have a PDD content of about 85% by mole and a TFE content of about 15% by mole. Other comonomers are believed to be present in these AF polymers.

The integral porous membrane also can be composed of a blend of two or more amorphous halopolymers or a blend of an amorphous halopolymer with other polymers. The integral membrane also can include other ingredients such as plasticizers, lubricants, and other additives such as process aids.

The integral porous membrane of the present invention can have any suitable pore size. Thus, e.g., the membrane has an average pore size of about 100 μm or less, preferably from about 0.01 μm to about 100 μm. In some embodiments, the membrane has an average pore size of about 0.1 μm or less, or from about 0.1 μm to about 10 μm. Preferably, the membrane has an average pore size of about 1 μm or less. Particular embodiments of the integral porous membrane have pores with an average size of from about 0.01 μm to about 0.05 μm. The integral porous membrane of the present invention is useful in a variety of applications including microfiltration, ultrafiltration, nanofiltration, and reverse osmosis.

An advantage of the present invention is that small pore size integral membranes, e.g., those having an average pore size of from about 0.01 μm to about 0.05 μm, can also be produced in accordance with the present invention. Such small pore sizes are difficult to produce from halopolymers by the expansion method generally employed in the preparation of PTFE membranes. Small pore size integral porous membranes can find use in, for example, demanding purification applications in the semiconductor industry.

The integral porous membrane of the present invention can have a symmetric or asymmetric structure. The integral porous membrane of the present invention can be a sheet, fiber, plug, or tube. The integral porous membrane of the present invention can be unsupported, i.e., self-supporting, or it can be supported by a substrate, e.g., a porous substrate such as a fabric, film, or membrane. The integral porous membrane can have any suitable thickness, e.g., below about 10 mil (250 μm), preferably from about 0.1 mil (2.5 μm) to about 5 mil (12.5 μm), and more preferably from about 0.5 mil (12.5 μm) to about 2 mil (50 μm), and even more preferably about 1 mil (25 μm) (±0.1 mil (2.5 μm)).

The membrane of the present invention can be prepared by methods known to those skilled in the art. For example, the membrane can be prepared by melt extrusion or solution casting. In melt extrusion, e.g., the amorphous halopolymer can be mixed with suitable pore formers and extruded into a sheet, a fiber, a plug, or a tube. The resulting product is washed or extracted to remove the pore former, and a porous membrane is recovered. Alternatively, a solution of the polymer can be cast as a sheet, fiber, or tube, and phase inversion can be induced.

Phase inversion can be induced by the wet process, the dry process, the thermal process, or the polymer-assisted process, and preferably by the wet process. See, e.g., Robert E. Kesting, *Synthetic Polymer Membranes*, Ch. 7, pp. 237–286 (1985), the disclosure of which is incorporated herein in its entirety by reference.

In an embodiment, the present invention provides a process for preparing the integral porous membrane comprising an amorphous halopolymer comprising:

(a) providing a solution of the halopolymer;

(b) shaping the solution to form a pre-membrane; and (c) causing phase inversion of the pre-membrane to obtain the integral porous membrane.

A membrane casting solution can be prepared by dissolving the desired quantity of the amorphous halopolymer in a suitable solvent. Preferably the solvent dissolves the amorphous polymer under mild or moderate conditions, for example, below 100° C., preferably below 60° C., and more preferably at ambient temperatures (about 20–25° C.). An example of a suitable solvent is a halogenated solvent, preferably a fluorocarbon. A preferred solvent is perfluoro-(2-butyltetrahydrofuran), available as FC™ –75 from 3M Co.

The membrane casting solution preferably includes one or more nonsolvents. Suitable nonsolvents include, but are not limited to, GENESOLV™ 2000 (1,1-dichloro-1-fluoroethane) from AlliedSignal, Inc., FC-43 (perfluoro $C_{12}$ alkane) from 3M Co., ECTFE™ oil (ethylene-chlorotrifluoroethylene copolymer) from Halocarbon Co. (River Edge, N.J.), and isopropanol.

The casting solution can be prepared by first dissolving the desired amount of the amorphous polymer in a solvent. The nonsolvent is added with mixing. Typically, the addition of the nonsolvent is stopped just prior to the point of incipient gelation, that is, prior to the formation of a gel or two phases.

The casting solution can contain the amorphous halopolymer in any suitable amount, e.g., in an amount of up to about 30% by weight, preferably from about 5% to about 20% by weight, and more preferably from about 7% to about 15% by weight. The casting solution can contain the solvent in any suitable amount, e.g., in an amount of up to about 95% by weight, preferably from about 50% by weight to about 90% by weight, and more preferably from about 60% by weight to about 80% by weight. The nonsolvent can be present in the casting solution in any suitable amount, e.g., in an amount of up to about 30% by weight, preferably from about 5% to about 30% by weight, and more preferably from about 15% to about 25% by weight. The casting solution can contain additional ingredients such as pore formers, plasticizers, swelling agents, and the like.

The casting solution can be processed into any desired membrane configuration, for example, a sheet, a fiber, a plug, or a tube. Thus, for example, the casting solution can be spread on a casting surface such as a glass plate or stainless steel belt using a casting blade or knife. The thickness of the resulting pre-membrane can be controlled by, for example, adjusting the gap between the blade and the casting surface.

Alternatively, the casting solution can be spread by spin coating. For example, the casting solution can be spin coated on a substrate by employing a spin coater such as Model No. P6204-A from Specialty Coating Systems, Inc. (Indianapolis, Ind.). Illustratively, a substrate such as a glass plate or PTFE sheet can be spun at a desired speed, and the casting solution placed on the substrate. The spinning is continued until a coating is obtained. Any suitable spinning speed, e.g., about 800 rpm or less, preferably from about 50 to about 250 rpm, and more preferably from about 60 rpm to about 200 rpm, can be employed. Optionally, a release agent can be employed which facilitates the removal of the membrane from the substrate. Any suitable release agent can be used, for example, a fluorocarbon or silicone. A particular example of a release agent that can be used with PTFE substrate is the Halocarbon oil #56.

The pre-membrane is allowed to undergo phase inversion. Phase inversion can be caused or induced in the wet process by the use of a nonsolvent, or in the thermal process by changing the temperature of the pre-membrane. Nonsolvent-induced phase inversion can be carried out by treating the pre-membrane with a nonsolvent for the halopolymer. This treatment can be carried out by, e.g., immersing the pre-membrane in a bath containing the nonsolvent or by exposing to the vapor of a nonsolvent in a controlled atmosphere chamber. The resulting membrane is dried to remove the nonsolvent. The unsupported membrane can be relatively easily removed from the glass plate or stainless steel surface. Alternatively, the casting solution can be cast on a suitable support such as a woven or non-woven fabric to obtain a supported membrane.

In other embodiments of the present invention, the casting solution can be extruded through a die in the form of a sheet, fiber, plug, or tube. Suitable bore fluids can be employed to prepare hollow fibers or tubes.

In those embodiments including a substrate or support material, a variety of materials are suitable. The material can be hydrophobic or hydrophilic, and porous or non-porous. Typically, the material is synthetic, more preferably, polymeric. Suitable polymers include, for example, polyamide, polyester, polyvinylidene fluoride, polyacrylic, polyolefins such as polyethylene and polypropylene. An example of a preferred polymer is polytetrafluoroethylene.

Further examples of a substrate or support material include polyamide, polysulfone, polyester, an acrylic polymer, polyacrylic nitrile, polyvinyl heterocyclic, polyheterocyclic, polycarbonate, polyimide, polyamide-imide, polylactide, polyglycolide, polypeptide, polyether, epoxy resin, polyacetal, polyurethane, polyurea, urea-formaldehyde resin, polyphenol, phenol-formaldehyde resin, alkyd resin, melamine-formaldehyde resin, a dendrimer, a spiro polymer, polyaryleneoxide, polysulfide, polyketone, polyetherketone, polyetheretherketone, polyaromatic, polyaldehyde, cellulose, cellulose ester, cellulose derivative, or a combination thereof.

In those embodiments including a porous substrate, the porous substrate can have any suitable pore size, for example, a pore size of below about 10 $\mu$m. The porous substrate can be asymmetric or symmetric.

The substrate can be prepared by methods known to those of ordinary skill in the art. For example, a porous substrate can be prepared by a phase inversion process. Thus, a casting solution containing the polymer, a solvent, a pore former, a wetting agent, and optionally a small quantity of a non-solvent is prepared by combining and mixing the ingredients, preferably at an elevated temperature. The resulting solution is filtered to remove any impurities. The casting solution is cast or extruded in the form of a sheet or hollow fiber. The resulting sheet or fiber is allowed to set or gel as a phase inverted membrane. The set membrane is then leached to remove the solvent and other soluble ingredients.

The integral membrane can be placed in contact with the substrate by methods known to those of ordinsry skill in the tat. For example, in an embodiment, the integral membrane can be co-extruded with the substrate or support material. In another embodiment, the integral membrane can be cast, e.g., solvent-cast on a substrate or support material. In yet another embodiment, the integral membrane can be cast, formed, or deposited on a fluid surface, e.g., water surface, and the membrane can be lifted onto a substrate or support material.

The present invention further provides devices, such as filter devices, comprising the integral porous membrane of the present invention. The device can be in any suitable form. Typical filter devices comprise a housing including at least one inlet and at least one outlet defining a fluid flow path between the inlet and the outlet, and a membrane of the present invention disposed across the fluid flow path or tangentially to the fluid flow path.

Illustratively, the device can include a filter element comprising a membrane sheet, e.g., in a substantially planar or pleated form. In an embodiment, the element can have a hollow generally cylindrical form. If desired, the device can include the filter element in combination with upstream and/or downstream support or drainage layers. The device can include a plurality of membranes, e.g., to provide a multilayered filter element, or stacked to provide a membrane module. Filter cartridges can be constructed by including a housing and endcaps to provide fluid seal as well as at least one inlet and at least one outlet. The devices can be constructed to operate in crossflow or tangential flow modes as well as dead-end modes. Accordingly, the fluid to be treated can be passed, for example, tangentially to the membrane surface, or passed perpendicular to the membrane surface. For embodiments of the membrane which are in the form of a tube or fiber, or bundles of tubes or fibers, the membrane(s) can be configured as modules, e.g., after potting their ends in an adhesive.

The integral porous membranes can also find use as gas filters, e.g., for allowing gases to pass through while retaining liquids. The integral porous membranes are particularly attractive for such applications in view of the oleophobic and hydrophobic properties of certain embodiments. The membranes can find use in applications involving gas flowthrough wherein the material should be resistant to penetration by water, oil, or lipid emulsions. Such applications include gas vents or filters hat protect electronic equipment placed in proximity to automotive engines. The integral porous membranes can also find use in venting of medical devices, and in industrial filtration where oil mists are present.

The integral porous membranes of the present invention can find use as a support material or substrate for preparing coated composite membranes such as gas selective membranes. The integral porous membrane also can find use as gas contactors, for example, for distributing gases into liquids.

The present invention further provides a process for treating fluids, e.g., at least one contaminated fluid, comprising passing at least a portion of the fluid through the integral porous membrane of the present invention and recovering a contaminant depleted fluid. Illustratively, the fluid can be a corrosive fluid such as sulfuric acid or hydrofluoric acid. Examples of suitable fluids include etching fluids used in the electronics industry. An example of a contaminant is a particle such as a metal, polymer, or ceramic particle. It is further contemplated that the membrane of the present invention can be used to remove virus, bacteria, and other contaminants from fluids. In another embodiment of the present invention, valuable biological materials such as proteins can be removed or isolated from fluids.

The membranes of the present invention have the desirable surface characteristics to undergo little or no fouling and/or allow rapid membrane cleaning. The membranes of the present invention have solvent resistance, chemical resistance, and heat resistance. Preferably, the membrane as well as the device of the present invention are free or substantially free of leachables. Accordingly, the purity of the treated fluids is not compromised.

Membranes in accordance with embodiments of the present invention have one or more advantageous properties. The membranes are mechanically stable or robust. For example, the membranes are flexible. The membranes resist mechanical stresses encountered during membrane production, handling, and/or fabrication of devices. The membranes are crease or wrinkle resistant. The membranes are free or substantially free of pinhole or other defects.

EXAMPLE 1

This Example illustrates a method of preparing a membrane according to an embodiment of the present invention.

A membrane casting solution was prepared by mixing 4 ml of a 12% by weight solution of AF 1600 and 1 ml of GENESOLV 2000. The casting solution obtained was cast on a cleaned glass plate to a wet thickness of about 3 mil (75 $\mu$m) using a doctor blade. The resulting pre-membrane was then immersed in a bath containing GENESOLV 2000. The membrane was allowed to remain in the nonsolvent bath until it was free of residues. The membrane was then dried in air. The integral porous membrane prepared as above was about 1 mil (25 $\mu$m) thick and had a surface microstructure depicted in FIG. 1.

All of the references cited herein, including publications, patents, and patent applications, are hereby incorporated in their entireties by reference.

While this invention has been described with an emphasis upon certain embodiments, it will be obvious to those of ordinary skill in the art that variations of the embodiments may be used and that it is intended that the invention may be practiced otherwise than as specifically described herein. Accordingly, this invention includes all modifications encompassed within the scope of the invention as defined by the following claims.

What is claimed is:

1. An integral porous membrane comprising an amorphous halopolymer comprising a fluorocopolymer including tetrafluoroethylene and a perfluoro-1,3-dioxole, wherein the porous membrane has a pore size of from about 0.1 $\mu$m to about 10 $\mu$m.

2. The integral porous membrane of claim 1, wherein said perfluoro-1,3-dioxole is perfluoro-2,2-dimethyl-1,3-dioxole.

3. The integral porous membrane of claim 2, wherein said copolymer includes from about 10% to about 40% by mole of tetrafluoroethylene and from about 90% to about 60% by mole of perfluoro-2,2-dimethyl-1,3-dioxole.

4. The integral porous membrane of claim 2, wherein said copolymer includes from about 30% to about 40% by mole of tetrafluoroethylene and from about 70% to about 60% by mole of perfluoro-2,2-dimethyl-1,3-dioxole.

5. The integral porous membrane of claim 2, wherein said copolymer includes about 35% by mole of tetrafluoroethylene and about 65% by mole of perfluoro-2,2-dimethyl-1,3-dioxole.

6. The integral porous membrane of claim 2, wherein said copolymer includes about 15% by mole of tetrafluoroethylene and about 85% by mole of perfluoro-2,2-dimethyl-1,3-dioxole.

7. The integral porous membrane of claim 1, wherein the membrane has an asymmetric structure.

8. The integral porous membrane of claim 1, wherein the membrane has a symmetric structure.

9. The integral porous membrane of claim 1, which is a microfiltration membrane.

10. The integral porous membrane of claim 1, which is an ultrafiltration membrane.

11. The integral porous membrane of claim 1, which is a sheet.

12. The integral porous membrane of claim 1, which is unsupported.

13. The integral porous membrane of claim 1, which is supported.

14. The membrane of claim 1, wherein said amorphous halopolymer is soluble in a solvent at ambient temperatures.

15. The membrane of claim 14, wherein said solvent is a fluorinated solvent.

16. The membrane of claim 1, wherein the amorphous halopolymer has a degree of crystallinity less than about 30%.

17. A process for preparing an integral porous membrane comprising an amorphous halopolymer, the process comprising:

(a) providing a solution of said halopolymer the halopolymer comprising a fluorocopolymer including tetrafluoroethylene and a perfluoro-1,3-dioxide;

(b) shaping the solution to form a pre-membrane; and (c) causing phase inversion of the pre-membrane to obtain the integral porous membrane, wherein the membrane has an average pore size of about 0.1 $\mu$m to about 10 $\mu$m.

18. The process of claim 17, wherein said perfluoro-1,3-dioxole is perfluoro-2,2-dimethyl-1,3-dioxole.

19. The process of claim 17, wherein said copolymer includes from about 10% to about 40% by mole of tetrafluoroethylene and from about 90% to about 60% by mole of perfluoro-2,2-methyl-1,3-dioxole.

20. The process of claim 17, wherein said copolymer includes from about 30% to about 40% by mole of tetrafluoroethylene and from about 70% to about 60% by mole of perfluoro-2,2-dimethyl-1,3-dioxole.

21. The process of claim 17, wherein said copolymer includes about 35% by mole of tetrafluoroethylene and about 65% by mole of perfluoro-2,2-dimethyl-1,3-dioxole.

22. The process of claim 17, wherein said copolymer includes about 15% by mole of tetrafluoroethylene and about 85% by mole of perfluoro-2,2-dimethyl-1,3-dioxole.

23. The process of claim 17, wherein said solution contains a fluorocarbon solvent.

24. The process of claim 17, wherein the solution further includes a nonsolvent for the halopolymer.

25. The process of claim 17, wherein said phase inversion is caused by treating the pre-membrane with a nonsolvent.

26. The process of claim 17, wherein said phase inversion is caused by changing the temperature of the pre-membrane.

27. A membrane prepared by the process of claim 17.

28. A device comprising a housing including an inlet and an outlet defining a fluid flow path between the inlet and the outlet, and the membrane of claim 1 disposed across the fluid flow path.

29. A device comprising a housing, at least one inlet and at least one outlet defining a fluid flow path between the inlet and the outlet, and the membrane of claim 1 disposed tangentially to the fluid flow path.

30. A process for treating a contaminated fluid comprising passing at least a portion of the fluid through the porous membrane of claim 1 and recovering a contaminant depleted fluid.

31. The process of claim 30, wherein said contaminated fluid is corrosive.

32. A process for recovering a material from a fluid comprising contacting said fluid with a membrane of claim 1 so as to retain at least a portion of the material on the membrane.

33. The membrane of claim 13, which includes a porous support.

34. The membrane of claim 33, wherein the porous support comprises polytetrafluoroethylene.

* * * * *